United States Patent
Zhao et al.

(10) Patent No.: US 10,225,773 B2
(45) Date of Patent: Mar. 5, 2019

(54) CELLULAR-NETWORK-ASSISTED WIRELESS LOCAL AREA NETWORK CHANNEL SWITCH ANNOUNCEMENT METHOD

(71) Applicant: SHANGHAI RESEARCH CENTER FOR WIRELESS COMMUNICATIONS, Shanghai (CN)

(72) Inventors: Cheng Zhao, Shanghai (CN); Yuanping Zhu, Shanghai (CN); Yang Yang, Shanghai (CN); Honglin Hu, Shanghai (CN); Haifeng Wang, Shanghai (CN); Hua Qian, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 0 days.

(21) Appl. No.: 15/100,315

(22) PCT Filed: Dec. 28, 2015

(86) PCT No.: PCT/CN2015/099268
§ 371 (c)(1),
(2) Date: May 30, 2016

(87) PCT Pub. No.: WO2017/016167
PCT Pub. Date: Feb. 2, 2017

(65) Prior Publication Data
US 2018/0132149 A1 May 10, 2018

(30) Foreign Application Priority Data

Jul. 28, 2015 (CN) .......................... 2015 1 0454069

(51) Int. Cl.
*H04W 36/06* (2009.01)
*H04W 36/00* (2009.01)
(Continued)

(52) U.S. Cl.
CPC ........... *H04W 36/06* (2013.01); *H04W 36/00* (2013.01); *H04W 36/0077* (2013.01);
(Continued)

(58) Field of Classification Search
CPC . H04W 36/06; H04W 48/10; H04W 72/0453; H04W 72/02; H04W 48/12; H04W 36/0077; H04W 84/12
See application file for complete search history.

(56) References Cited

U.S. PATENT DOCUMENTS 9,820,302 B2 * 11/2017 Choi ..................... H04W 74/04
2004/0190467 A1 * 9/2004 Liu .................. H04W 52/0216
370/311

(Continued)

FOREIGN PATENT DOCUMENTS

CN 103686881 A 3/2014
CN 103686890 A 3/2014
(Continued)

Primary Examiner — Tejis Daya
(74) Attorney, Agent, or Firm — Hauptman Ham, LLP

(57) ABSTRACT

The present invention discloses a cellular-network-assisted wireless local area network (WLAN) channel switch announcement method, including the following steps: before a wireless network access point (AP) performs channel switching, delivering channel switch announcement signaling to correlated user equipment in a broadcast manner, and sending channel switch announcement request signaling to a cellular network base station that also serves the user equipment; after the cellular network base station receives the channel switch announcement request signaling, sending the channel switch announcement signaling to user equipment in an idle mode by using a cellular link air interface;
(Continued)

and performing, by the WLAN AP, channel switching within a predetermined time, and following, by user equipment that directly acquires channel switch information by receiving the channel switch announcement signaling and user equipment that acquires channel switch information by using the cellular network base station, the WLAN AP and performing channel switching.

10 Claims, 3 Drawing Sheets

(51) Int. Cl.
    *H04W 48/10*   (2009.01)
    *H04W 48/12*   (2009.01)
    *H04W 72/02*   (2009.01)
    *H04W 72/04*   (2009.01)
    *H04W 84/12*   (2009.01)

(52) U.S. Cl.
    CPC ........... *H04W 48/10* (2013.01); *H04W 48/12* (2013.01); *H04W 72/02* (2013.01); *H04W 72/0453* (2013.01); *H04W 84/12* (2013.01); *Y02D 70/14* (2018.01)

(56) References Cited

U.S. PATENT DOCUMENTS

| | | | | |
|---|---|---|---|---|
| 2007/0297438 A1* | 12/2007 | Meylan | ............ | H04W 52/0216 370/445 |
| 2012/0329456 A1* | 12/2012 | Makh | .................... | H04W 48/14 455/435.1 |
| 2014/0016568 A1 | 1/2014 | Koskela et al. | | |
| 2014/0140208 A1* | 5/2014 | Cherian | ............ | H04W 28/0289 370/230 |
| 2015/0036575 A1* | 2/2015 | Li | ..................... | H04W 52/0216 370/311 |
| 2015/0195849 A1* | 7/2015 | Bashar | .................. | H04W 16/14 370/330 |
| 2015/0264609 A1 | 9/2015 | Zhang et al. | | |
| 2016/0007247 A1* | 1/2016 | Lee | .................. | H04W 36/0066 370/331 |

FOREIGN PATENT DOCUMENTS

| | | |
|---|---|---|
| CN | 103702375 A | 4/2014 |
| CN | 104038971 A | 9/2014 |
| WO | 2014013424 A2 | 1/2014 |
| WO | 2014056163 A1 | 4/2014 |

\* cited by examiner

CELLULAR-NETWORK-ASSISTED WIRELESS LOCAL AREA NETWORK CHANNEL SWITCH ANNOUNCEMENT METHOD

CROSS REFERENCE TO RELATED APPLICATION

This application claims the priority of International Application No. PCT/CN2015/099268, filed on Dec. 28, 2015, which claims priority to Chinese Application No. 201510454069.6, filed on Jul. 28, 2015. The entire disclosures of each of the above applications are incorporated herein by reference.

BACKGROUND

Technical Field

The present invention relates to a wireless local area network (WLAN) channel switch announcement method, and more particularly to a cellular-network-assisted WLAN channel switch announcement method, and belongs to the technical field of wireless communications.

Related Art

Wireless network access points (WLAN AP) usually need to be deployed densely in a densely populated area (for example, an airport, a station, a stadium, and a school dormitory), to meet network access and service requirements that grow explosively. The deployed APs may belong to different carriers or may serve different users. An existing WLAN device mainly works in two unauthorized frequency bands of 2.4 GHz and 5 GHz, and due to the lack of sufficient communication and coordination, a same working channel may be selected for basic service sets (BSS) that are close to each other, resulting in strong mutual interference or fierce channel contention, depriving user equipment of a satisfying service. For such a case, some APs need to perform channel switching, to avoid using a same channel as a nearby AP uses, so as to provide a service to a user more desirably. In addition, according to requirements of telecommunications regulatory authorities, when a signal from a different system such as radar is detected on a working channel, a WLAN network needs to be switched to another channel as soon as possible to avoid affecting (or being affected) by the different system such as radar.

According to the IEEE 802.11 series standards, after deciding to perform channel switching, before performing channel switching, an AP needs to announce, to user equipments correlated to the AP, that after a particular period of time, a BSS is to be migrated to a new channel to work. Such a channel switch announcement may be broadcast by the AP in a beacon frame, or may be included in a probe response.

Because wireless portable devices are usually powered by batteries, from the perspective of reducing power consumption and extending service life of batteries, user equipment preferentially enters a power save (PS) mode. User equipment in a PS mode only wakes up periodically according to a listen interval to receive a beacon frame sent by an AP, where the listen interval is obtained through negotiation in a stage of establishing a correlation with the AP, or wakes up to send data when the user equipment has an uplink packet to send, or the user equipment wakes up at any time to send a PS-poll frame to the AP to query whether the AP has downlink buffer data to be sent to the user equipment.

As can be seen from a manner in which an AP announces channel switching and a working manner of user equipment in a PS mode, a method that is specified in a current protocol and is used by an AP to announce channel switching to user equipment may have the following errors: Because of a requirement for rapid channel switching, the AP needs to perform channel switching before the user equipment in a PS mode can receive a channel switch announcement of the AP. These user equipments that have not received the announcement may wake up and lose correlations with the original AP, and scanning needs to be performed again and correlations need to be established again, so that not only time is consumed, but also power saving of the user equipments becomes more difficult.

As shown in FIG. 1, when an AP needs to be switched to another channel (referred to as a second channel for short), the AP broadcasts and delivers a beacon frame carrying information about a channel switch announcement, where a count field in the channel switch announcement is set to 2 to reflect a rapid switch property, and every time one target beacon transmission time (TBTT) passes, the count field is subtracted by 1. When count=0, the AP immediately performs channel switching and is switched from a first channel to the second channel. Listen intervals negotiated when correlations are being established between the AP and user equipment 1 and user equipment 2 that are under the coverage of the AP are respectively 2 beacon frames and 4 beacon frames. That is, the user equipment 1 wakes up at an interval of 2 beacon frames, and the user equipment 2 wakes up at an interval of 4 beacon frames. The user equipment 1 has a relatively short listen interval, so that listening is relatively frequent, and the user equipment 1 can receive a beacon frame broadcast by the AP before the AP switches a channel, so as to obtain a channel switch plan of the AP. The user equipment 2 wakes up only after the AP has completed channel switching, and misses the channel switch announcement sent by the AP.

Accordingly, several problems may be caused:

1. The user equipment 2 wakes up and needs to perform channel scanning again and establish correlations again, so that a relatively long time is consumed and power consumption of the user equipment 2 is increased.

2. Data buffered by the AP in place of the user equipment 2 may reach a time threshold and is therefore discarded.

3. The user equipment 2 performs channel scanning again and is switched to another AP, and cannot receive a buffered frame in an original AP.

As can be seen, if user equipment does not receive a channel switch announcement from an AP, user experience becomes poor. Therefore, it is necessary to design a corresponding solution to such a problem.

For some user equipments in an idle mode, there may be a problem of missing a channel switch announcement of an AP, to which there are already some solutions in the industry. For example, Chinese patent application No. CN103686881A proposes a solution in which an adjacent AP that works on a same channel is used to assist with announcement, and informs sleeping user equipments, which are correlated to an AP that performs channel switching, of channel switch information, so that these user equipments can follow the original serving AP in time and perform channel switching. In the solution, after deciding to perform switching, an AP 1 that needs to perform channel switching informs an adjacent AP 2 of information related to channel switching by using an access controller (AC), where the AP 2 works on a same channel. If user equipment is in an idle mode and misses a channel switch announcement of the AP 1, the user equipment wakes up and sends a probe request on the original channel, and the AP 2 receives the corresponding probe request frame, then makes a response, and announces, to the corresponding user equipment, channel switch information (carrying a media access control (MAC) address of the AP 1 and information about a new channel) of the AP 1. However, an obvious limitation that exists in the solution is that the AP 1 and a nearby AP 2 need to work on a same channel and the AP 1 and the AP2 can communicate by using the AC. In an actual scenario, adjacent APs that are on a same channel are not necessarily deployed by a same carrier/individual and may be unable to exchange information by using the AC.

In addition, the PCT application No. WO2014013424A2 proposes that after an AP completes channel switching, a beacon frame can be sent on both an old channel and a new channel, where a beacon frame carrying information, that is, a post-announcement, related to the new channel of the AP is sent on the old channel, to instruct sleeping user equipment to complete channel switching; or when the new channel is in a contention-free period, the AP returns to the old channel to send the beacon frame carrying the information, that is, the post-announcement, related to the new channel of the AP, to instruct sleeping user equipment to complete channel switching. In the foregoing solution, the AP is required to simultaneously send a beacon frame on multiple channels, causing that feasibility is low.

SUMMARY

A technical problem to be resolved by the present invention is to provide a cellular-network-assisted WLAN channel switch announcement method.

To implement the foregoing inventive objective, the present invention uses the following technical solutions:

A cellular-network-assisted WLAN channel switch announcement method includes the following steps:

before a WLAN AP performs channel switching, delivering channel switch announcement signaling to correlated user equipment in a broadcast manner, and sending channel switch announcement request signaling to a cellular network base station that also serves the user equipment;

after the cellular network base station receives the channel switch announcement request signaling, sending the channel switch announcement signaling to user equipment in an idle mode by using a cellular link air interface; and performing, by the WLAN AP, channel switching within a predetermined time, following, by user equipment that directly acquires channel switch information by receiving the channel switch announcement signaling and user equipment that acquires channel switch information by using the cellular network base station, the WLAN AP and performing channel switching.

Preferably, the WLAN AP sends the channel switch announcement signaling in a periodically broadcast beacon frame.

Preferably, when a correlation is being established between the user equipment and the WLAN AP, the user equipment performs negotiation on a listen interval, and before the user equipment enters an idle mode, the user equipment performs negotiation with the WLAN AP, so that the WLAN AP predicts when the user equipment wakes up to listen to a beacon frame.

Preferably, the WLAN AP determines, according to a state of correlated user equipment and a time to perform switching, user equipment that may be unable to receive the channel switch announcement signaling, and maps, according to a pre-negotiated mapping rule for a user equipment ID, a user equipment ID that misses the channel switch announcement signaling into an ID type that can be parsed by the cellular network base station.

Preferably, after the WLAN AP sends a recognizable ID of user equipment in a WLAN to the cellular network base station, the cellular network base station searches for a corresponding ID of the user equipment in a cellular network according to a pre-negotiated mapping manner.

Preferably, after the cellular network base station receives the channel switch announcement request signaling sent by the WLAN AP, if a terminal identifier included in the channel switch announcement request signaling is a user equipment ID recognizable in a cellular network, the cellular network base station directly sends the channel switch announcement signaling to the user equipment, and otherwise, the cellular network base station first maps the terminal identifier in the channel switch announcement request signaling into a user equipment ID recognizable in the cellular network, and then sends the channel switch announcement signaling to the user equipment.

Preferably, the cellular network base station sends the channel switch announcement signaling to the user equipment by using radio resource control (RRC) control signaling.

Preferably, the channel switch announcement request signaling includes the following content: a user equipment ID that cannot receive the channel switch announcement signaling as predicted by the WLAN AP, an ID of the WLAN AP, a channel switch mode of the WLAN AP, a channel before switching, a channel after switching, and a time for channel switching.

Preferably, the channel switch announcement signaling includes the following content: an ID of the WLAN AP, a channel switch mode of the WLAN AP, a channel before switching, a channel after switching, and a time for channel switching.

Compared with the prior art, the WLAN channel switch announcement method provided in the present invention is applicable to a heterogeneous network formed of a cellular network and a WLAN, so that a cellular network base station can be used to assist with sending of channel switch announcement signaling of a WLAN AP, and user equipment that is in an idle mode to save power is effectively informed of channel switch information, to enable the user equipment to rapidly follow the AP and perform channel switching, thereby avoiding a process of performing scanning and establishing a correlation again.

DETAILED DESCRIPTION

The technical content of the present invention is described below in detail with reference to the accompanying drawings and specific embodiments.

In recent years, a heterogeneous network formed of a cellular network and a WLAN has drawn wide attention. In an architecture of the heterogeneous network, a more desirable service can be provided to a user by using information exchange and a coordination mechanism between the cellular network and the WLAN and by using respective characteristics of the two networks, thereby effectively improving user experience.

Figure 1:
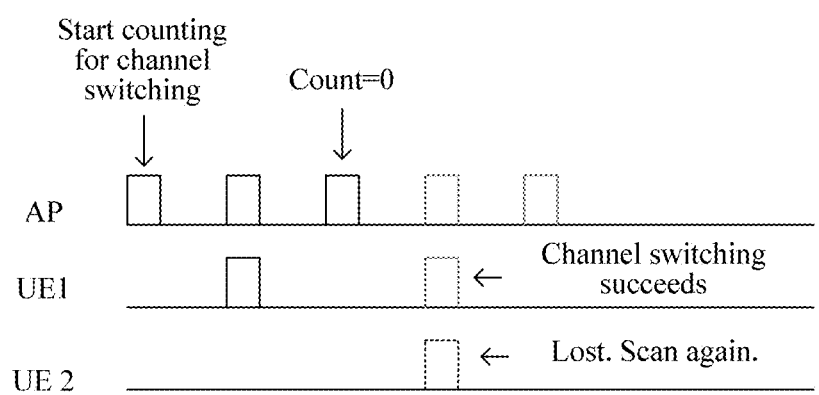
FIG. 1 is a schematic diagram that user equipment is in an idle mode and therefore misses a channel switch announcement of an AP.
Figure 2:
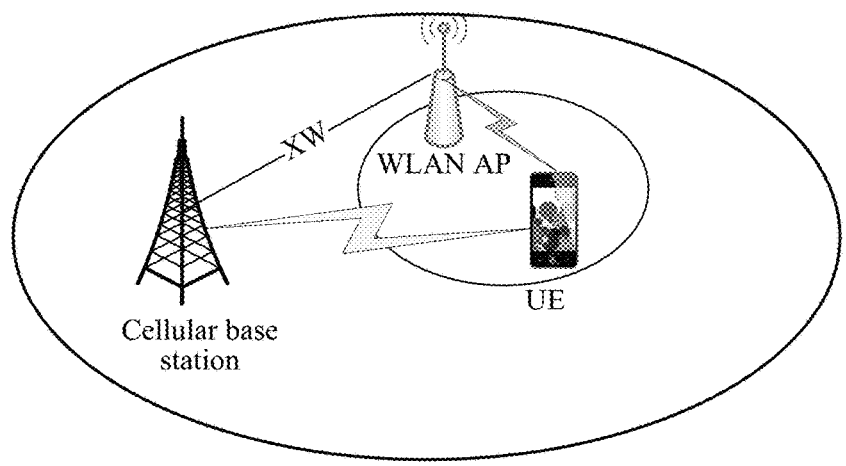
FIG. 2 is an exemplary diagram of a heterogeneous network formed of a cellular network and a WLAN.

As shown in FIG. 2, in a heterogeneous network formed of a cellular network and a WLAN, a WLAN AP provides a WiFi access service in a relatively small area, whereas a cellular network base station provides macro cellular coverage in a wide area. The cellular network base station and the WLAN AP are connected by using a control plane interface (an XW interface). User equipment in a service area of the WLAN needs to have a multiple-network access (Multi-RAT) capability, that is, the user equipment can keep both connections of the WLAN and the cellular network. When a WLAN module of the user equipment is in an idle mode in a PS mode, a cellular link module of the user equipment can still receive RRC control signaling from the cellular network.

Before performing channel switching, the WLAN AP broadcasts channel switch announcement signaling in the network. However, some user equipments are in an idle mode in a PS mode and may miss the channel switch announcement signaling of the AP. To prevent these sleeping user equipments from waking up and losing correlations with the original AP because of missing the channel switch announcement signaling, the present invention proposes a method of using a cellular network to assist with sending of the channel switch announcement signaling in the WLAN, so that user equipment whose WLAN module is in an idle mode can receive, in time, information indicating that an AP is about to perform channel switching. Detailed description is provided below with reference to FIG. 3.

In the present invention, the AP and user equipment correlated to the AP periodically detect a channel condition. If a signal from a different system such as radar is detected on a current channel, or relatively strong interference occurs on a current channel, or network performance is severely reduced because contention with a nearby BSS is excessively fierce on a current channel, the AP may trigger channel switching, and select a relatively idle target channel according to measurement results of the AP and the user equipment.

Next, the AP sends the channel switch announcement signaling in a periodically broadcast beacon frame. The channel switch announcement signaling includes a field "new channel number" and a field "channel switch count", and specific formats are shown in Table 1:

TABLE 1

Channel switch announcement signaling broadcast by the AP by using a beacon

| Element ID | Length | Channel Switch Mode | New Channel Number | Channel Switch Count |
| --- | --- | --- | --- | --- |

The fields in Table 1 are explained as follows:
Element ID: Represents an identifier of an element
Length: Represents the length of a frame
Channel switch mode: Channel switch mode. If this bit is set to 1, connected user equipment stops sending a frame until channel switching is complete. If the bit is set to 0, sending of a frame is not limited.
New channel number: A sequence number of a new channel
Channel switch count: A count of channel switching, and this records how many beacon frame intervals are to pass to perform channel switching.

Figure 3:
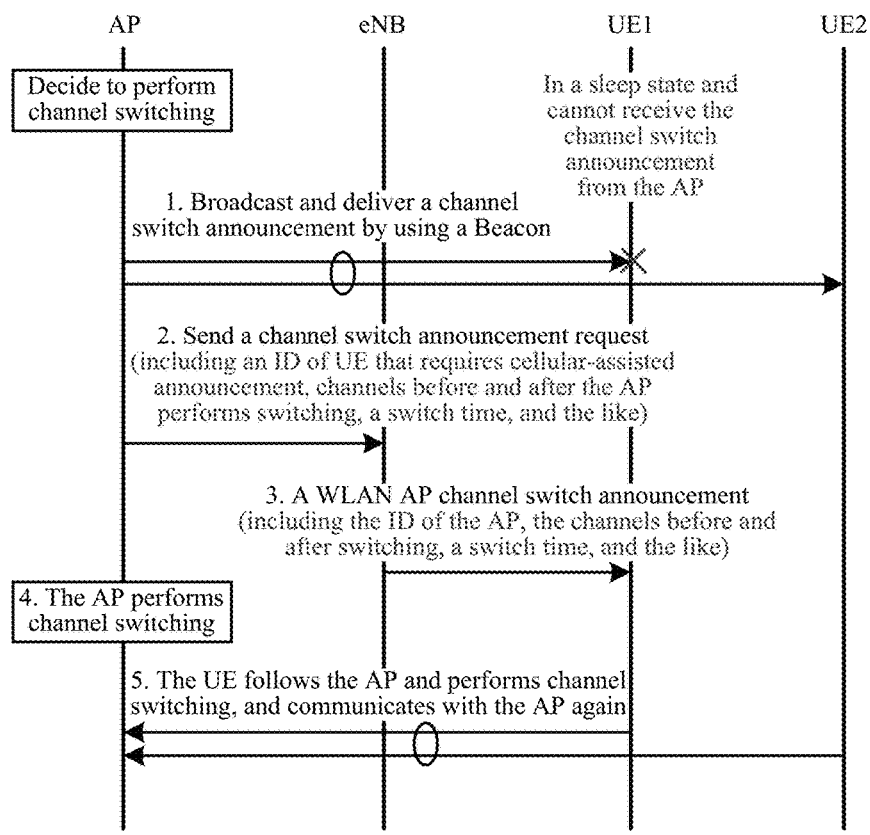
FIG. 3 is a flowchart of sending of channel switch announcement signaling assisted by a cellular network base station in the present invention.

As shown in FIG. 3, in a process in which the AP sends the channel switch announcement signaling in a periodically broadcast beacon frame, some user equipments (for exemplary, UE1 in FIG. 3) is in an idle mode in a PS mode and therefore cannot receive the channel switch announcement signaling. For this, the AP determines, according to a state of correlated user equipment and a time to perform switching, user equipment that may be unable to receive the channel switch announcement signaling sent by the AP, and maps, according to a pre-negotiated mapping rule for a user equipment ID, a user equipment ID that misses the channel switch announcement signaling into an ID type that can be parsed by the cellular network base station.

It should be noted that when a correlation is being established between the user equipment and the AP, the user equipment performs negotiation on a listen interval, and before the user equipment enters an idle mode, the user equipment performs negotiation with the AP, so that the AP can predict when the user equipment wakes up to listen to a beacon frame. After the AP decides a time to perform channel switching, if user equipments that are correlated to the AP are in an idle mode, the AP may know which user equipments do not wake up in time to listen to a beacon frame and therefore miss the channel switch announcement signaling carrying a channel switch announcement.

In another embodiment of the present invention, mapping of a user equipment ID may be performed at the cellular network base station, that is: after the AP sends a recognizable ID of user equipment in a WLAN network to the cellular network base station, the cellular network base station searches for a corresponding ID of the user equipment in a cellular network according to a pre-negotiated mapping manner.

After the AP decides to perform channel switching, the AP sends, by using an interface such as a control plane interface (an XW interface) between the WLAN AP and the cellular network, channel switch announcement request signaling to the cellular network base station that also serves these user equipments. The channel switch announcement request signaling includes the following content: a user equipment ID that cannot receive the channel switch announcement signaling as predicted by the AP, an ID (a MAC address or a basic service set identifier (BSSID), a service set identifier (SSID), a homogenous extended service set identifier (HESSID), and the like) of the AP, a channel switch mode of the AP, a channel before switching, a channel after switching, a time for channel switching, and the like.

Table 2 shows one example of the channel switch announcement request signaling.

TABLE 2

Channel switch announcement request signaling sent by the AP to the cellular network base station

| User equipment identifier #1 | ... | User equipment identifier #n | AP identifier | Channel switch mode | Channel number before switching | Channel number after switching | Channel switch time |
| --- | --- | --- | --- | --- | --- | --- | --- |

After the cellular network base station receives the channel switch announcement request signaling sent by the AP, if a terminal identifier included in the signaling is an ID (for example, a cell radio network temporary identity (C-RNTI) of the terminal) of user equipment recognizable in the cellular network, the cellular network base station directly sends the channel switch announcement signaling to these user equipments by using RRC control signaling, and otherwise, the cellular network base station needs to first map the terminal identifier in the channel switch announcement request signaling into a user equipment ID recognizable in the cellular network, and then send the channel switch announcement signaling to these user equipments.

The foregoing channel switch announcement signaling at least needs to include the following content: ID information (a MAC address or an BSSID, an SSID, an HESSID, and the like) of the AP, a channel switch mode of the AP, a channel before switching, a channel after switching, a time for channel switching, and the like. Table 3 provides one example of the channel switch announcement signaling.

TABLE 3

Channel switch announcement signaling sent by the cellular network base station to the user equipment

| AP identifier | Channel switch mode | Channel number before switching | Channel number after switching | Channel switch time |
| --- | --- | --- | --- | --- |

After receiving the channel switch announcement request signaling, the cellular network base station forwards the channel switch announcement request signaling to specific sleeping user equipment by using RRC control signaling and through a cellular link air interface, thereby ensuring that the user equipment can rapidly follow the AP and perform channel switching, and reducing an energy overhead of the user equipment. After receiving the channel switch announcement signaling by using a cellular link, the user equipment in an idle mode follows the correlated AP in time after the AP performs channel switching, thereby avoiding a time-consuming and power-consuming process of performing scanning again and establishing a correlation again.

The AP performs channel switching within a predetermined time, and user equipment that directly acquires channel switch information by receiving the channel switch announcement signaling and user equipment that acquires channel switch information by using the cellular network base station may follow the AP and perform channel switching, and perform communication on a channel after switching.

Compared with the prior art, in the present invention, a cellular network base station is used to assist with sending of channel switch announcement signaling of a WLAN AP, and user equipment that is in an idle mode to save power is effectively informed of channel switch information, to enable the user equipment to rapidly follow the AP and perform channel switching, thereby avoiding a process of performing scanning and establishing a correlation again.

The cellular-network-assisted WLAN channel switch announcement method provided in the present invention is described above in detail; however, apparently, specific implementation forms of the present invention are not limited thereto. Various obvious changes made to the present invention by a person of ordinary skill in the art without departing from the spirit and claims of the present invention shall fall within the protection scope of the present invention.

What is claimed is:

1. A cellular-network-assisted wireless local area network (WLAN) channel switch announcement method, comprising the following steps:
   before a wireless network access point (AP) performs channel switching, delivering channel switch announcement signaling to correlated user equipments in a broadcast manner, and sending channel switch announcement request signaling to a cellular network base station that serves the user equipments, the channel switch announcement request signaling comprises: a user equipment ID for the user equipment that cannot receive the channel switch announcement signaling as predicted by the WLAN AP, an ID of the WLAN AP, a channel switch mode of the WLAN AP, a channel before switching, a channel after switching, and a time for channel switching;
   the cellular network base station, after receiving the channel switch announcement request signaling, sending the channel switch announcement signaling to a user equipment in an idle mode via a cellular link air interface, wherein a cellular link module of the user equipment can receive RRC control signaling from the cellular network when the user equipment is in an idle mode; and
   the WLAN AP performing channel switching within a predetermined time, the user equipment that directly acquires channel switch information by receiving the channel switch announcement signaling and the user equipment that acquires channel switch information from the cellular network base station, following the WLAN AP and performing channel switching.

2. The WLAN channel switch announcement method according to claim 1, wherein
   the WLAN AP sends the channel switch announcement signaling in a periodically broadcast beacon frame.

3. The WLAN channel switch announcement method according to claim 2, wherein
   when a correlation is being established between the user equipment and the WLAN AP, the user equipment negotiates on a listen interval, and negotiates with the WLAN AP, before the user equipment enters an idle mode, so that the WLAN AP predicts when the user equipment wakes up to listen to a beacon frame.

4. The WLAN channel switch announcement method according to claim 1, wherein
   according to a state of the correlated user equipments and a time to perform switching, the WLAN AP determines the user equipment that may be unable to receive the channel switch announcement signaling, and according to a pre-negotiated mapping rule for a user equipment ID, maps the user equipment ID for the user equipment that misses the channel switch announcement signaling into an ID type that can be parsed by the cellular network base station.

5. The WLAN channel switch announcement method according to claim 1, wherein
   after the WLAN AP sends the user equipment ID recognizable in a WLAN to the cellular network base station, the cellular network base station searches for a corresponding user equipment ID in a cellular network according to the pre-negotiated mapping rule.

6. The WLAN channel switch announcement method according to claim 1, wherein
   after the cellular network base station receives the channel switch announcement request signaling from the WLAN AP, the cellular network base station sends the channel switch announcement signaling to the user equipment according to a user equipment ID recognizable in the cellular network.

7. The WLAN channel switch announcement method according to claim 6, wherein
the cellular network base station sends the channel switch announcement signaling to the user equipment by using radio resource control (RRC) control signaling.

8. The WLAN channel switch announcement method according to claim 1, wherein
the channel switch announcement signaling comprises: an ID of the WLAN AP, a channel switch mode of the WLAN AP, a channel before switching, a channel after switching, and a time for channel switching.

9. The WLAN channel switch announcement method according to claim 1, wherein
when a correlation is being established between the user equipment and the WLAN AP, the user equipment negotiates on a listen interval, and negotiates with the WLAN AP, before the user equipment enters an idle mode, so that the WLAN AP predicts when the user equipment wakes up to listen to a beacon frame.

10. The WLAN channel switch announcement method according to claim 1, wherein
the cellular network base station sends the channel switch announcement signaling to the user equipment by using radio resource control (RRC) control signaling.

\* \* \* \* \*